No. 753,729. PATENTED MAR. 1, 1904.
G. P. OATES.
SEEDING ATTACHMENT FOR CORN PLANTERS.
APPLICATION FILED AUG. 1, 1903.
NO MODEL. 2 SHEETS—SHEET 1.

Witnesses
F. Llewellyn Walker
Chas. D. Milch

Inventor
George P. Oates
By Staley & Bowman
Attorneys

No. 753,729. PATENTED MAR. 1, 1904.
G. P. OATES.
SEEDING ATTACHMENT FOR CORN PLANTERS.
APPLICATION FILED AUG. 1, 1903.
NO MODEL.
2 SHEETS—SHEET 2.
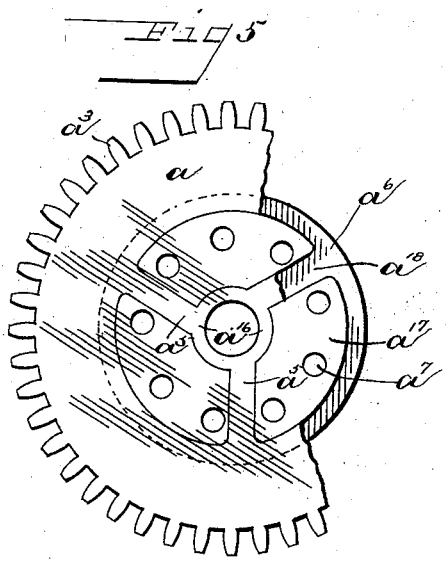
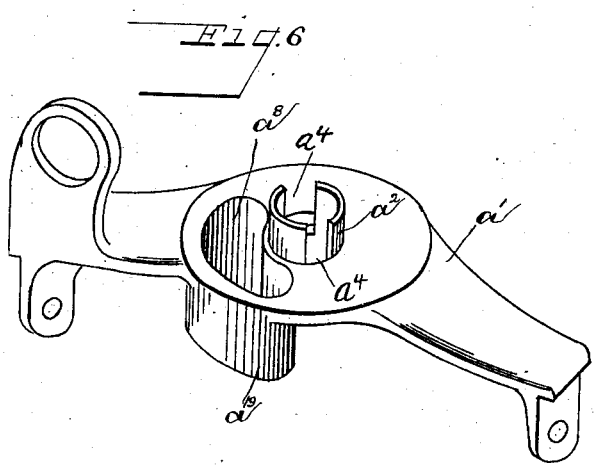
Witnesses
F. Llewellyn Walker
Chas. F. Welch
Inventor
George P. Oates
By Staley & Borman
Attorneys No. 753,729.                                        Patented March 1, 1904.

UNITED STATES PATENT OFFICE.

GEORGE P. OATES, OF SPRINGFIELD, OHIO, ASSIGNOR TO AMERICAN SEEDING MACHINE COMPANY, OF JERSEY CITY, NEW JERSEY, A CORPORATION OF NEW JERSEY.

SEEDING ATTACHMENT FOR CORN-PLANTERS.

SPECIFICATION forming part of Letters Patent No. 753,729, dated March 1, 1904.

Application filed August 1, 1903. Serial No. 167,864. (No model.)

*To all whom it may concern:*

Be it known that I, GEORGE P. OATES, a citizen of the United States, residing at Springfield, in the county of Clark and State of Ohio, have invented certain new and useful Improvements in Seeding Attachments for Corn-Planters, of which the following is a specification.

My invention relates to improvements in corn-planter attachments, and more particularly to the part of the corn-planter known as the "feed and hopper" thereof.

My object is to construct a removable device which can be used in a corn-planter in such manner that the planter will sow grain other than corn. In this kind of a machine the sowing of the corn requires a specific kind of plate in the hopper of the corn-planter, which plate is not adapted to the sowing of other kinds of grain.

In most forms of corn-planters as now manufactured they are furnished with a special hopper and feed for fertilizer in addition to the hopper and feed for the corn, which fertilizer is fed into the same furrow into which the corn is planted.

My especial object is to utilize the part of the corn-planter adapted to sow fertilizer for the sowing of grain other than corn simultaneously with the corn.

Figure 1:
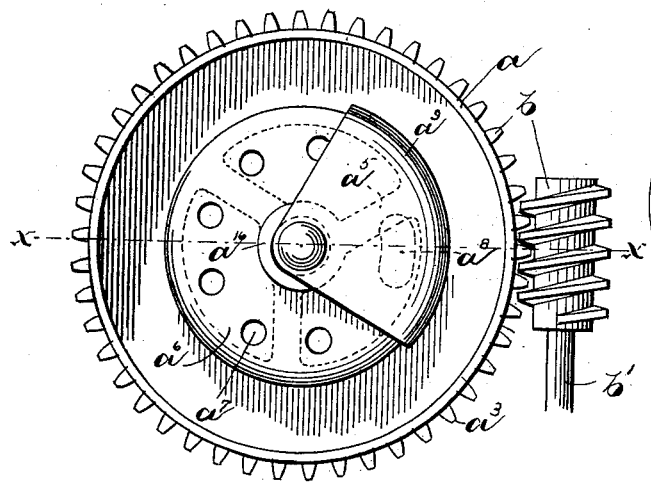
Figure 3:
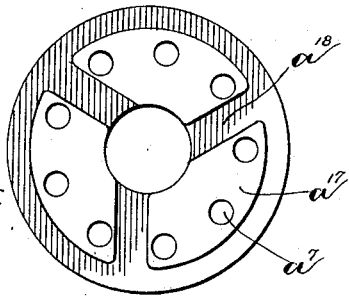
Figure 2:
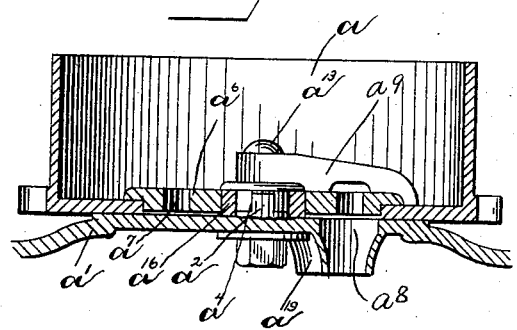
Figure 4:
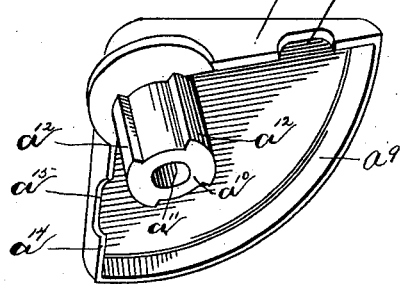

In the accompanying drawings, Figure 1 is a plan view of my device. Fig. 2 is a vertical section through the same along the line $xx$ in Fig. 1. Fig. 3 is a detail view of the removable plate. Fig. 4 is a detail of the hood or cap used in this device. Fig. 5 is a plan view of the under side of the hopper, partly broken away, and showing the removable seed-plate in position thereon, partly in full and partly in dotted lines. Fig. 6 is a detail of the support.

Like parts are represented by similar letters of reference in the several views.

In Fig. 1 I have shown the cylinder or hopper, (marked $a$,) which is adapted to be revolved by a worm-gear $b$, which is formed on the shaft $b'$ (see Fig. 1) and which in turn is connected with the driving-wheels of the machine. $a'$ represents the support for the cylinder or hopper, Figs. 2 and 6, which support may be connected with the frame of the machine in any suitable manner, and the cylinder or hopper $a$ revolves upon said support. There is a sleeve $a^2$, formed on said support, of specific form, extending upwardly, and the cylinder revolves about said sleeve. The cylinder is formed with the teeth $a^3$, which are adapted to be engaged by the worm $b$, which causes the hopper or cylinder to revolve. The sleeve $a^2$ is formed with slots $a^4$. (See Figs. 2 and 6.) The bottom of the cylinder $a$ is formed with arms $a^5$, (shown in dotted lines in Fig. 1 and in Fig. 5,) and the fertilizer ordinarily passes through the openings between these arms into the conduit of the machine and is sown with the corn.

By my improvement I add a supplemental or additional plate $a^6$, which is adapted readily to be inserted in the hopper, and the same fits over the hub $a^{16}$ of the cylinder and has enlarged portions $a^{17}$ on its under surface corresponding in shape and size to the openings between the arms $a^5$ in the bottom of the cylinder and of a thickness substantially equal to the thickness of said arms, the said enlarged portions being adapted when the supplemental plate is placed in position on the bottom of the cylinder or hopper to fit in the openings between the arms $a^5$, and thus cover up said openings, the spaces $a^{18}$ between said enlarged portions fitting over the arms $a^5$. By this means the supplemental plate is removably connected to the said hopper or cylinder and will revolve therewith. This plate $a^6$ is formed with apertures $a^7$, as shown in Fig. 1, and these apertures are shaped for sowing any particular kind of grain. I have shown them in this instance particularly adapted to sow beans. I have shown an opening $a^8$, Fig. 1, through which the grain drops when carried to that point by the plate $a^6$ and dropped through the apertures $a^7$. This opening $a^8$ extends through the support for the hopper and forms a connection with the conduit $a^{19}$, and from this conduit grain passes to the furrow through any suitable device. It will be understood that beans or other grain placed in this hopper $a$ are delivered in predetermined amounts and at predetermined distances into the same furrow in which the corn is planted and while the corn is being planted in predetermined amounts.

It will be readily understood that with this machine there may be furnished different kinds of supplemental or additional plates having different forms of openings, so that the operator can adjust the machine for sowing different kinds of grain in connection with the planting of the corn.

In order to insure the accuracy of the sowing of the beans or other grains in this supplemental hopper, I have shown a hood, (marked $a^9$,) which is also removable and adapted readily to be placed within the cylinder or hopper by the most ignorant operator. This hood is formed with a projecting stud $a^{10}$, provided with an opening $a^{11}$, extending therethrough and adapted to receive a bolt, as hereinafter explained. This projecting stem or stud $a^{10}$ is also formed with two ribs on its sides, (marked $a^{12}$.) This hood is fitted onto the base of the cylinder or hopper so that the stem $a^{10}$ projects within the sleeve $a^2$, and the slots in the sleeve $a^2$ receive the ribs $a^{12}$, formed on said stud $a^{10}$. A bolt $a^{13}$ passes through the opening $a^{11}$ and securely fastens the hood to the support $a$, as shown in Fig. 1. The hood is formed with flanges $a^{14}$, and there are openings $a^{15}$ formed in said flanges, one of said openings being to permit the grain to pass through the hood to the opening $a^8$ and the other opening $a^{15}$ being to permit surplus grain which may accumulate in the hood to pass therefrom to prevent clogging. When the grain has been placed within the hopper or cylinder $a$, some of the grain drop into the openings $a^7$ of the revolving plate $a^6$, and in the device I have shown these openings as adapted to drop beans in the requisite amount desired to be sown. The openings $a^{15}$ are so formed and arranged that they provide an adequate means for permitting a portion of the grain which extends above the plate to pass under the hood and be carried by the plate within the hood without being crushed; but grain can only be fed to the opening or conduit $a^8$ by dropping through the openings $a^7$. Consequently the grain will be fed into the opening $a^8$ by first dropping upon the plate $a^6$, and this grain when the plate revolves will be carried through the openings $a^{15}$ into the inner part of the hood $a^9$, and when the plate continues to revolve until one of the apertures $a^7$ coincides with the opening $a^8$ the seed will then drop within the opening and be fed to the furrow.

Having thus described my invention, I claim—

1. In a corn-planter, a revolving seed-hopper, means for revolving same, with a removable seed-plate adapted to fit within the bottom of said hopper, and means for revolving same in unison therewith, a stationary hood and means for feeding the grain within the hood, for the purpose specified.

2. In a corn-planter, a support, a sleeve on said support, and a revolving seed-hopper journaled on said sleeve, a removable plate journaled on the hopper, slots formed in the sleeve, a stationary hood adapted to be removed, a projecting stem formed on said hood, arms formed on said stem, and means for holding said arms within the slots in said sleeve, for the purpose specified.

3. In a corn-planter, a hopper journaled on a support on said planter, said hopper having openings formed in the bottom thereof and radial arms dividing said openings, and a removable seed-plate fitted in the bottom of said hopper, said seed-plate having enlarged portions on its under side of a size and shape to fit the openings in said hopper, the spaces between said enlarged portions being adapted to fit over the said arms, as specified.

4. In a corn-planter, a support, a revolving hopper supported thereby, a removable seed-plate, means formed in said hopper for supporting said seed-plate, and means for revolving said seed-plate in unison with said hopper, a sleeve projecting from said support through said hopper and seed-plate and a stationary hood fastened to said sleeve, for the purpose specified.

5. In a corn-planter, a support and a revolving hopper supported thereby, a base formed in said hopper with ribs and a central hub, a seed-plate with a series of openings fitted removably to said base and over said hub, the openings in said seed-plate adapted to register with the openings between the ribs of said base, and means for revolving the hopper and seed-plate in unison, for the purpose specified.

6. In a corn-planter, a hopper journaled on a support on said planter, openings and radial arms formed in the bottom thereof, a removable seed-plate with a series of openings therein registering with each opening in said hopper, enlarged portions on the under side of said seed-plate and means for fitting said enlarged portions within the openings in said hopper and for fitting the rings of the hopper in the spaces formed between the enlarged portions of said seed-plate, for the purpose specified.

In testimony whereof I have hereunto set my hand this 28th day of July, A. D. 1903.

GEORGE P. OATES.

Witnesses:
 FRANK D. PACKBURN,
 CHAS. I. WELCH.